(12) United States Patent
Ishida et al.

(10) Patent No.: US 11,878,460 B2
(45) Date of Patent: *Jan. 23, 2024

(54) THREE-DIMENSIONAL SHAPED ARTICLE PRODUCTION METHOD

(71) Applicant: SEIKO EPSON CORPORATION, Tokyo (JP)

(72) Inventors: Masaya Ishida, Hara-mura (JP); Eiji Okamoto, Matsumoto (JP); Hiroshi Wada, Azumino (JP); Toshimitsu Hirai, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,727

(22) Filed: Dec. 5, 2022

(65) Prior Publication Data

US 2023/0111896 A1 Apr. 13, 2023

Related U.S. Application Data

(63) Continuation of application No. 17/020,036, filed on Sep. 14, 2020, now Pat. No. 11,565,314, which is a (Continued)

(30) Foreign Application Priority Data

Jan. 22, 2016 (JP) .................. 2016-010395

(51) Int. Cl.
*B22F 10/16* (2021.01)
*B22F 10/43* (2021.01)
(Continued)

(52) U.S. Cl.
CPC .......... *B29C 64/112* (2017.08); *B22F 3/1017* (2013.01); *B22F 3/1021* (2013.01);
(Continued)

(58) Field of Classification Search
CPC ......... B22F 10/00; B33Y 10/00; B33Y 40/00; B33Y 40/10; B33Y 40/20
See application file for complete search history.

(56) References Cited

U.S. PATENT DOCUMENTS 5,204,055 A 4/1993 Sachs et al.
5,745,834 A 4/1998 Bampton
(Continued)

FOREIGN PATENT DOCUMENTS

EP 2263861 12/2010
JP 06-218712 A 8/1994
(Continued)

OTHER PUBLICATIONS

"Glossary of Metallurgical and Metalworking Terms," Metals Handbook, ASM Handbooks Online, ASM International, 2002, pp. 1, 210, 257. (Year: 2002).*

(Continued)

*Primary Examiner* — Vanessa T. Luk
(74) *Attorney, Agent, or Firm* — WORKMAN NYDEGGER (57) ABSTRACT

A three-dimensional shaped article production method for producing a three-dimensional shaped article by stacking layers to form a stacked body includes a first layer formation step of forming a first layer on a support by supplying a first composition containing first particles and a binder, a second layer formation step of forming a second layer composed of one layer or a plurality of layers on the first layer by supplying a second composition containing second particles and a binder, and a separation step of separating the second layer from the support through the first layer, wherein after the separation step, a sintering step of sintering the second layer is performed.

13 Claims, 8 Drawing Sheets

Related U.S. Application Data continuation of application No. 15/411,587, filed on Jan. 20, 2017, now Pat. No. 10,814,389.

(51) Int. Cl.

| | | |
|---|---|---|
| *B33Y 10/00* | (2015.01) | |
| *B22F 10/60* | (2021.01) | |
| *B29C 64/112* | (2017.01) | |
| *B29C 64/165* | (2017.01) | |
| *B29C 64/40* | (2017.01) | |
| *B33Y 80/00* | (2015.01) | |
| *B22F 3/10* | (2006.01) | |
| *B22F 12/30* | (2021.01) | |
| *B22F 12/55* | (2021.01) | |
| *B22F 10/20* | (2021.01) | |
| *B33Y 50/02* | (2015.01) | |
| *B23K 26/342* | (2014.01) | |
| *B23K 26/70* | (2014.01) | |
| *B28B 1/00* | (2006.01) | |
| *B33Y 30/00* | (2015.01) | |
| *B29K 105/00* | (2006.01) | |

(52) U.S. Cl.
CPC ............ *B22F 10/16* (2021.01); *B22F 10/20* (2021.01); *B22F 10/43* (2021.01); *B22F 12/30* (2021.01); *B22F 12/55* (2021.01); *B23K 26/342* (2015.10); *B23K 26/70* (2015.10); *B28B 1/001* (2013.01); *B29C 64/165* (2017.08); *B29C 64/40* (2017.08); *B33Y 10/00* (2014.12); *B33Y 50/02* (2014.12); *B33Y 80/00* (2014.12); *B22F 10/60* (2021.01); *B22F 2998/10* (2013.01); *B22F 2999/00* (2013.01); *B29K 2105/251* (2013.01); *B33Y 30/00* (2014.12)

(56) References Cited

U.S. PATENT DOCUMENTS

| | | |
|---|---|---|
| 8,880,209 B2 | 11/2014 | Yasukochi |
| 10,814,389 B2 | 10/2020 | Ishida |
| 11,565,314 B2 * | 1/2023 | Ishida .................. B22F 3/1017 |
| 2015/0037498 A1 | 2/2015 | Bruck |
| 2015/0258705 A1 | 9/2015 | Hirata |
| 2016/0332370 A1 | 11/2016 | Arai |
| 2017/0207001 A1 | 7/2017 | Vella |
| 2017/0209929 A1 | 7/2017 | Ishida |
| 2017/0334140 A1 | 11/2017 | Andersson |
| 2018/0001381 A1 | 1/2018 | Kimblad |

FOREIGN PATENT DOCUMENTS

| | | |
|---|---|---|
| JP | 2000-073108 A | 3/2000 |
| JP | 2004-255839 A | 9/2004 |
| JP | 2007-021705 A | 2/2007 |
| JP | 2012-106437 A | 6/2012 |
| JP | 2015-081380 A | 4/2015 |
| WO | 2016/009602 A1 | 1/2016 |
| WO | 2016/079192 A1 | 5/2016 |
| WO | 2016113213 A1 | 7/2016 |

OTHER PUBLICATIONS

Joan L. Tomsic, editor, Dictionary of Materials and Testing, second ed., Society of Automotive Engineers, SAE International, 2000, p. 295. (Year: 2000).*

* cited by examiner

THREE-DIMENSIONAL SHAPED ARTICLE PRODUCTION METHOD

This application is a continuation of U.S. patent application Ser. No. 17/020,036, filed Sep. 14, 2020, which is a continuation of U.S. patent application Ser. No. 15/411,587, filed Jan. 20, 2017 and issued on Oct. 27, 2020 as U.S. Pat. No. 10,814,389, which claims priority to Japanese patent No. 2016-010395, filed Jan. 22, 2016, the entire disclosures of which are expressly incorporated by reference herein.

BACKGROUND

1. Technical Field

The present invention relates to a three-dimensional shaped article production method.

2. Related Art

In the related art, production methods for producing a three-dimensional shaped article by stacking layers have been performed. Among these, a three-dimensional shaped article production method in which a three-dimensional shaped article is formed on a support has been disclosed.

For example, JP-A-2000-73108 (Patent Document 1) discloses a three-dimensional shaped article production method in which a three-dimensional shaped article is formed on an up-and-down table as a support while sintering a metal powder layer.

However, in a three-dimensional shaped article production method in which a three-dimensional shaped article is formed on a support as disclosed in Patent Document 1, a sintered body of the three-dimensional shaped article is integrated with the support, or the like, and therefore, it is difficult to separate the sintered body of the three-dimensional shaped article from the support.

SUMMARY

An advantage of some aspects of the invention is to reduce the load when a three-dimensional shaped article is separated from a support.

A three-dimensional shaped article production method according to a first aspect of the invention is a three-dimensional shaped article production method for producing a three-dimensional shaped article by stacking layers to form a stacked body and includes a first layer formation step of forming a first layer on a support by supplying a first composition containing first particles and a binder, a second layer formation step of forming a second layer composed of one layer or a plurality of layers on the first layer by supplying a second composition containing second particles and a binder, and a separation step of separating the second layer from the support through the first layer, wherein after the separation step, a sintering step of sintering the second layer is performed.

According to this aspect of the invention, after the separation step of separating the second layer from the support, the sintering step of sintering the second layer is performed. Therefore, the integration or the like of the sintered body of the three-dimensional shaped article with the support can be suppressed, and the load when the three-dimensional shaped article is separated from the support can be reduced.

A three-dimensional shaped article production method according to a second aspect of the invention is directed to the first aspect, in which a binding force between the first particles by the binder contained in the first composition is smaller than a binding force between the second particles by the binder contained in the second composition.

According to this aspect, a binding force between the first particles by the binder contained in the first composition is smaller than a binding force between the second particles by the binder contained in the second composition. Therefore, when the second layer (a stacked body of the three-dimensional shaped article) is separated from the support in the separation step, the second layer is easily separated from the support without damaging the three-dimensional shaped article.

A three-dimensional shaped article production method according to a third aspect of the invention is directed to the second aspect, in which the amount of the binder contained in the first composition is smaller than the amount of the binder contained in the second composition.

According to this aspect, the amount of the binder contained in the first composition is smaller than the amount of the binder contained in the second composition. Therefore, a binding force between the first particles by the binder contained in the first composition can be made smaller than a binding force between the second particles by the binder contained in the second composition. As a result, when the second layer (a stacked body of the three-dimensional shaped article) is separated from the support in the separation step, the second layer is easily separated from the support without damaging the three-dimensional shaped article.

A three-dimensional shaped article production method according to a fourth aspect of the invention is directed to any one of the first to third aspects, in which, before the separation step, a separation promotion step of promoting the separation of the second layer from the support is performed.

According to this aspect, before the separation step, a separation promotion step of promoting the separation of the second layer from the support is performed. Therefore, the separation step can be facilitated.

A three-dimensional shaped article production method according to a fifth aspect of the invention is directed to the fourth aspect, in which the decomposition temperature of the binder contained in the first composition is lower than the decomposition temperature of the binder contained in the second composition, and the separation promotion step is a heating step of performing heating at a temperature higher than the decomposition temperature of the binder contained in the first composition and lower than the decomposition temperature of the binder contained in the second composition.

According to this aspect, the separation promotion step is a heating step of performing heating at a temperature higher than the decomposition temperature of the binder contained in the first composition and lower than the decomposition temperature of the binder contained in the second composition. Therefore, the separation promotion step can be performed easily.

A three-dimensional shaped article production method according to a sixth aspect of the invention is directed to the fourth aspect, in which the support is configured to be capable of transmitting an electromagnetic wave, and the separation promotion step is an electromagnetic wave irradiation step of irradiating the first composition with an electromagnetic wave through the support.

According to this aspect, the separation promotion step is an electromagnetic wave irradiation step of irradiating the first composition with an electromagnetic wave through the support. Therefore, the separation promotion step can be performed easily.

A three-dimensional shaped article production method according to a seventh aspect of the invention is directed to the sixth aspect, in which a titania layer is formed on the support.

According to this aspect, a titania layer is formed on the support. The binder which is in contact with the titania layer is easily decomposed by irradiation with an electromagnetic wave, and therefore, in the separation step, the separation of the second layer from the support can be particularly easily performed through the titania layer.

A three-dimensional shaped article production method according to an eighth aspect of the invention is directed to any one of the first to seventh aspects, in which the arithmetic average surface roughness Ra of the support is 5 µm or less.

According to this aspect, the arithmetic average surface roughness Ra of the support is 5 µm or less. That is, the surface of the support is smooth. Therefore, the occurrence of an anchor effect or the like on the support can be suppressed, and in the separation step, the separation of the second layer from the support can be particularly easily performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to the accompanying drawings. FIGS. 1A to 2B are schematic configuration views showing a configuration of a three-dimensional shaped article production apparatus according to an embodiment of the invention.

Figures 1A, 1B:
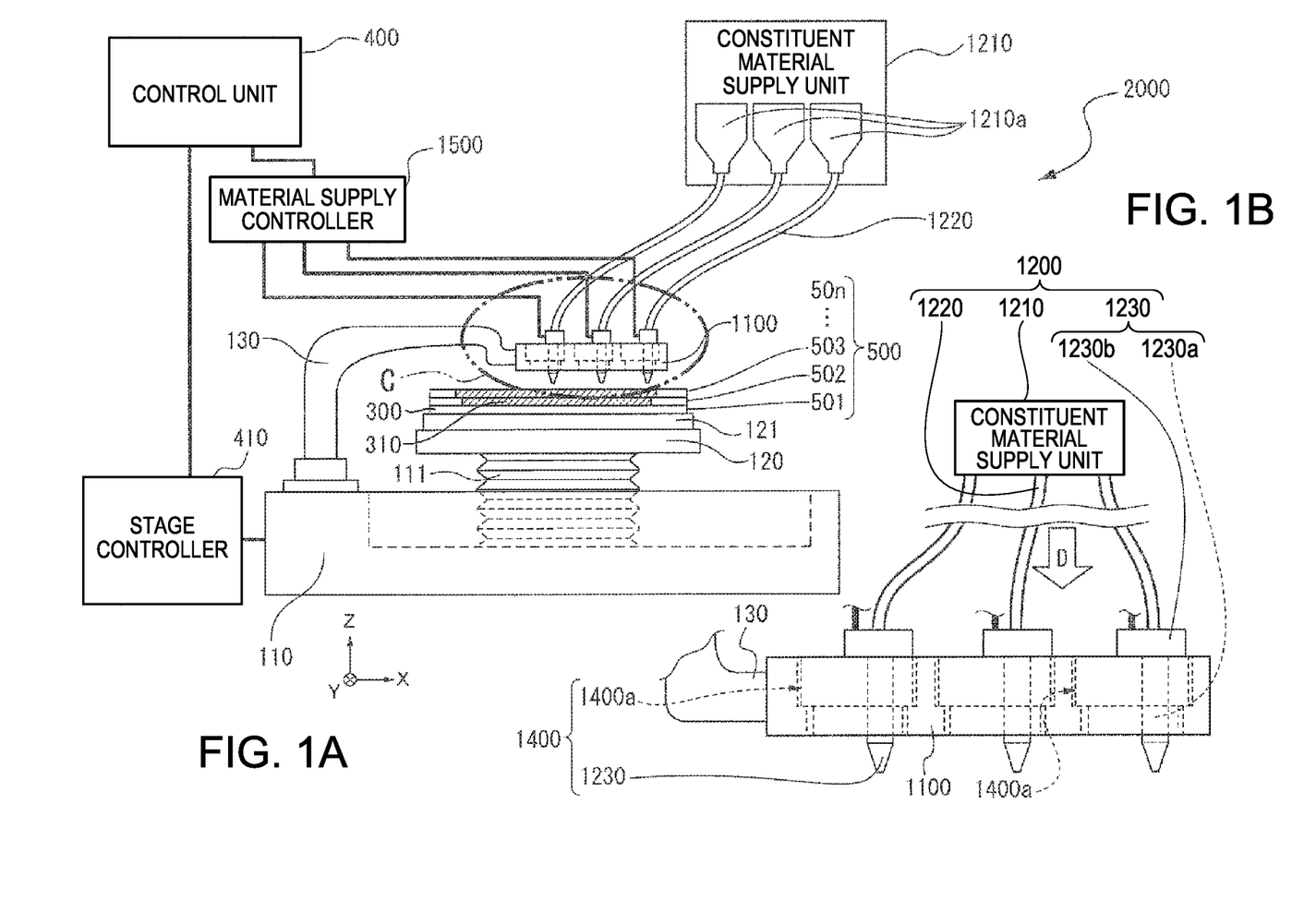
FIG. 1A is a schematic configuration view showing a configuration of a three-dimensional shaped article production apparatus according to an embodiment of the invention.
FIG. 1B is an enlarged view of a portion C shown in FIG. 1A.
Figures 2A, 2B:
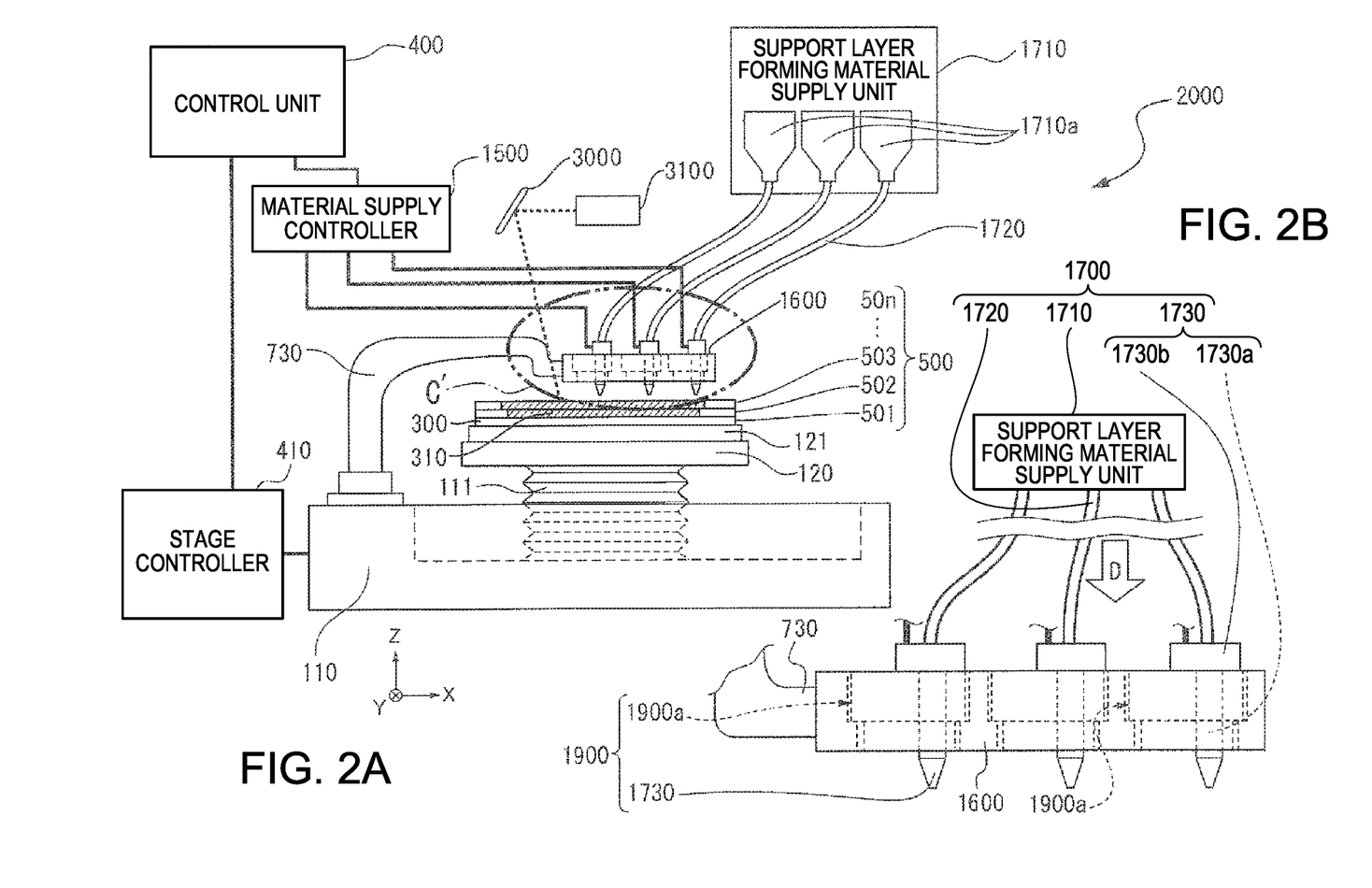
FIG. 2A is a schematic configuration view showing a configuration of a three-dimensional shaped article production apparatus according to an embodiment of the invention.
FIG. 2B is an enlarged view of a portion C' shown in FIG. 2A.

Here, the three-dimensional shaped article production apparatus according to this embodiment includes two material supply sections (head bases) and one heating section. Among these, FIGS. 1A and 1B are views showing only one material supply section (a material supply section which supplies a constituent material (a material containing particles constituting a three-dimensional shaped article, a solvent, and a binder)). FIGS. 2A and 2B are views showing one material supply section (a material supply section which supplies a support layer forming material for forming a support layer that supports a three-dimensional shaped article when the three-dimensional shaped article is formed) and one heating section (a heating section using a laser for sintering the support layer forming material).

The "three-dimensional shaping" as used herein refers to the formation of a so-called "three-dimensional shaped article", and also includes, for example, the formation of a shape with a thickness even if the shape is a plate shape or a so-called two-dimensional shape. Further, the "supporting" as used herein includes supporting from the lower side, and in addition thereto, also includes supporting from the lateral side, and in some cases, supporting from the upper side.

A three-dimensional shaped article production apparatus 2000 (hereinafter referred to as "forming apparatus 2000") shown in FIGS. 1A to 2B includes a base 110 and a stage 120 which is provided movably in the X, Y, and Z directions shown in the drawing or drivably in the direction of rotation about the Z axis by a drive device 111 as a drive unit provided for the base 110.

Then, as shown in FIGS. 1A and 1B, the three-dimensional shaped article production apparatus 2000 includes a head base support section 130, one end of which is fixed to the base 110, and to the other end of which, a head base 1100 that holds a plurality of head units 1400 each including a constituent material ejection section 1230 that ejects a constituent material is held and fixed.

Further, as shown in FIGS. 2A and 2B, the three-dimensional shaped article production apparatus 2000 includes a head base support section 730, one end of which is fixed to the base 110, and to the other end of which, a head base 1600 that holds a plurality of head units 1900 each including a support layer forming material ejection section 1730 that ejects a material for forming a support layer that supports a three-dimensional shaped article is held and fixed.

Here, the head base 1100 and the head base 1600 are provided in parallel in the XY plane.

The constituent material ejection section 1230 and the support layer forming material ejection section 1730 have the same configuration. However, the configuration is not limited thereto.

On the stage 120, layers 501, 502, and 503 are formed in the process for forming a three-dimensional shaped article 500. In the formation of the three-dimensional shaped article 500, thermal energy is applied by a laser or the like, and therefore, in order to protect the stage 120 from heat, by using a sample plate 121 having heat resistance, the three-dimensional shaped article 500 may be formed on the sample plate 121. The sample plate 121 of this embodiment is made of a metal so that it is sturdy and can make the surface smooth (capable of producing the three-dimensional shaped article 500 with higher accuracy) and also is easily produced. However, as the sample plate 121, for example, by using a ceramic plate, high heat resistance can be obtained, and also the reactivity with the constituent material of the three-dimensional shaped article to be melted (or which may be sintered) is low, and thus, alteration of the three-dimensional shaped article 500 can be prevented. Incidentally, in FIGS. 1A and 2A, for the sake of convenience of explanation, three layers: the layers 501, 502, and 503 are shown as examples, however, the layers (up to the layer 50*n* in FIGS. 1A and 2A) are stacked until the desired shape of the three-dimensional shaped article 500 is obtained. In this manner, in the forming apparatus 2000 of this embodiment, the three-dimensional shaped article 500 can be formed by using the sample plate 121, and also the three-dimensional shaped article 500 can be formed without using the sample plate 121. Therefore, either of the stage 120 and the sample plate 121 can serve as the support when forming the three-dimensional shaped article 500. However, in the following description, a case where the three-dimensional shaped article 500 is formed using the sample plate 121 is assumed and described.

Here, the layer 501 is a so-called release layer, and is constituted by a support layer 300 formed from a support layer forming material ejected from the support layer forming material ejection section 1730. The layer 501 is a first layer S1 formed by supplying the support layer forming material as a first composition containing first particles and a binder onto the support (see FIG. 7A).

Further, the layers 502, 503, . . . , and 50*n* are each constituted by a support layer 300 formed from the support layer forming material ejected from the support layer forming material ejection section 1730 and a constituent layer 310 formed from the constituent material ejected from the constituent material ejection section 1230. In other words, the layers 502, 503, . . . , and 50*n* are a second layer S2 composed of one layer or a plurality of layers formed by supplying the constituent material as a second composition containing second particles and a binder onto the layer 501 as the first layer S1 (see FIGS. 7B to 7E).

FIG. 1B is an enlarged conceptual view of a portion C showing the head base 1100 shown in FIG. 1A. As shown in FIG. 1B, the head base 1100 holds a plurality of head units 1400. Although a detailed description will be given later, each head unit 1400 is configured such that the constituent material ejection section 1230 included in a constituent material supply device 1200 is held by a holding jig 1400*a*. The constituent material ejection section 1230 includes an ejection nozzle 1230*a* and an ejection drive section 1230*b* that allows the constituent material to be ejected from the ejection nozzle 1230*a* by a material supply controller 1500.

FIG. 2B is an enlarged conceptual view of a portion C' showing the head base 1600 shown in FIG. 2A. As shown in FIG. 2B, the head base 1600 holds a plurality of head units 1900. Each head unit 1900 is configured such that the support layer forming material ejection section 1730 included in a support layer forming material supply device 1700 is held by a holding jig 1900*a*. The support layer forming material ejection section 1730 includes an ejection nozzle 1730*a* and an ejection drive section 1730*b* that allows the support layer forming material to be ejected from the ejection nozzle 1730*a* by the material supply controller 1500. Further, in the case where a material which can be sintered is used as the support layer forming material, a laser irradiation section 3100 for sintering the support layer forming material and a galvanometer mirror 3000 which determines the position of the laser light from the laser irradiation section 3100 are provided on the upper side of the stage 120.

As shown in FIGS. 1A and 1B, the constituent material ejection section 1230 is connected to a constituent material supply unit 1210 which houses a constituent material made to correspond to each head unit 1400 held by the head base 1100 through a supply tube 1220. Then, a given constituent material is supplied to the constituent material ejection section 1230 from the constituent material supply unit 1210. In the constituent material supply unit 1210, the constituent material of the three-dimensional shaped article 500 to be shaped by the forming apparatus 2000 according to this embodiment is housed in a constituent material housing section 1210*a*, and each individual constituent material housing section 1210*a* is connected to each individual constituent material ejection section 1230 through the supply tube 1220. In this manner, by including the individual constituent material housing sections 1210*a*, a plurality of different types of materials can be supplied from the head base 1100.

As shown in FIGS. 2A and 2B, the support layer forming material ejection section 1730 is connected to a support layer forming material supply unit 1710 which houses a support layer forming material made to correspond to each head unit 1900 held by the head base 1600 through a supply tube 1720. Then, a given support layer forming material is supplied to the support layer forming material ejection section 1730 from the support layer forming material supply unit 1710. In the support layer forming material supply unit 1710, the support layer forming material constituting a support layer when shaping the three-dimensional shaped article 500 is housed in a support layer forming material housing section 1710*a*, and each individual support layer forming material housing section 1710*a* is connected to each individual support layer forming material ejection section 1730 through the supply tube 1720. In this manner, by including the individual support layer forming material housing sections 1710*a*, a plurality of different types of materials can be supplied from the head base 1600.

Examples of the support layer forming material and the constituent material (the materials of the first particles and the second particles) include simple substance powders of magnesium (Mg), iron (Fe), cobalt (Co), chromium (Cr), aluminum (Al), titanium (Ti), copper, (Cu), and nickel (Ni), alloys containing at least one metal among these (a maraging steel, stainless steel, cobalt-chrome-molybdenum, a titanium alloy, a nickel alloy, an aluminum alloy, a cobalt alloy, and a cobalt-chrome alloy), various metal oxides such as silica, alumina, titanium oxide, zinc oxide, zircon oxide, tin oxide, magnesium oxide, and potassium titanate, various metal hydroxides such as magnesium hydroxide, aluminum hydroxide, and calcium hydroxide, various metal nitrides such as silicon nitride, titanium nitride, and aluminum nitride, various metal carbides such as silicon carbide and titanium carbide, various metal sulfides such as zinc sulfide, various metal carbonates such as calcium carbonate and magnesium carbonate, various metal sulfates such as calcium sulfate and magnesium sulfate, various metal silicates such as calcium silicate and magnesium silicate, various metal phosphates such as calcium phosphate, various metal borates such as aluminum borate and magnesium borate, composite compounds and the like thereof, and gypsum (various hydrates of calcium sulfate and anhydrous calcium sulfate).

A mixed powder of these materials can be used by being mixed with a solvent and a binder to form a mixed material or the like in the form of a slurry (or a paste).

It is also possible to use general purpose engineering plastics such as polyamide, polyacetal, polycarbonate, modified polyphenylene ether, polybutylene terephthalate, and polyethylene terephthalate. In addition thereto, it is also possible to use engineering plastics such as polysulfone, polyethersulfone, polyphenylene sulfide, polyarylate, polyimide, polyamideimide, polyetherimide, and polyether ether ketone.

In this manner, the constituent material and the support layer forming material are not particularly limited, and a metal other than the above-mentioned metals, a ceramic, a resin, or the like can also be used.

Examples of the solvent include water; (poly) alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; and ionic liquids such as tetra-alkyl ammonium acetate (for example, tetra-butyl ammonium acetate, etc.), and one type or two or more types in combination selected from these can be used.

As the binder, for example, an acrylic resin, an epoxy resin, a silicone resin, a cellulosic resin, or another synthetic resin, or PLA (polylactic acid), PA (polyamide), PPS (polyphenylene sulfide), PVDF (polyvinylidene fluoride), CMC (carboxymethyl cellulose), or another thermoplastic resin can be used.

The forming apparatus 2000 includes a control unit 400 as a control device which controls the stage 120, the constituent material ejection section 1230 included in the constituent material supply device 1200, and the support layer forming material ejection section 1730 included in the support layer forming material supply device 1700 based on the data for shaping a three-dimensional shaped article to be output from a data output device such as, for example, a personal computer (not shown) or the like. The control unit 400 includes a control section (not shown) which controls the stage 120 and the constituent material ejection section 1230 so that these members are driven and operated in cooperation with each other, and also controls the stage 120 and the support layer forming material ejection section 1730 so that these members are driven and operated in cooperation with each other.

The stage 120 provided movably for the base 110, and a signal for controlling the start and stop of movement, the direction of movement, the amount of movement, the speed of movement, or the like of the stage 120 is generated in a stage controller 410 based on a control signal from the control unit 400 and sent to the drive device 111 included in the base 110, and the stage 120 moves in the X, Y, or Z direction shown in the drawing. In the constituent material ejection section 1230 included in the head unit 1400, a signal for controlling the amount of the material ejected from the ejection nozzle 1230*a* in the ejection drive section 1230*b* included in the constituent material ejection section 1230 or the like is generated in the material supply controller 1500 based on a control signal from the control unit 400, and a predetermined amount of the constituent material is ejected from the ejection nozzle 1230*a* based on the generated signal.

In the same manner, in the support layer forming material ejection section 1730 included in the head unit 1900, a signal for controlling the amount of the material ejected from the ejection nozzle 1730*a* in the ejection drive section 1730*b* included in the support layer forming material ejection section 1730 or the like is generated in the material supply controller 1500 based on a control signal from the control unit 400, and a predetermined amount of the support layer forming material is ejected from the ejection nozzle 1730*a* based on the generated signal.

Next, the head unit 1400 will be described in further detail. The head unit 1900 has the same configuration as that of the head unit 1400, and therefore, a description of the detailed configuration of the head unit 1900 will be omitted.

Figure 3:
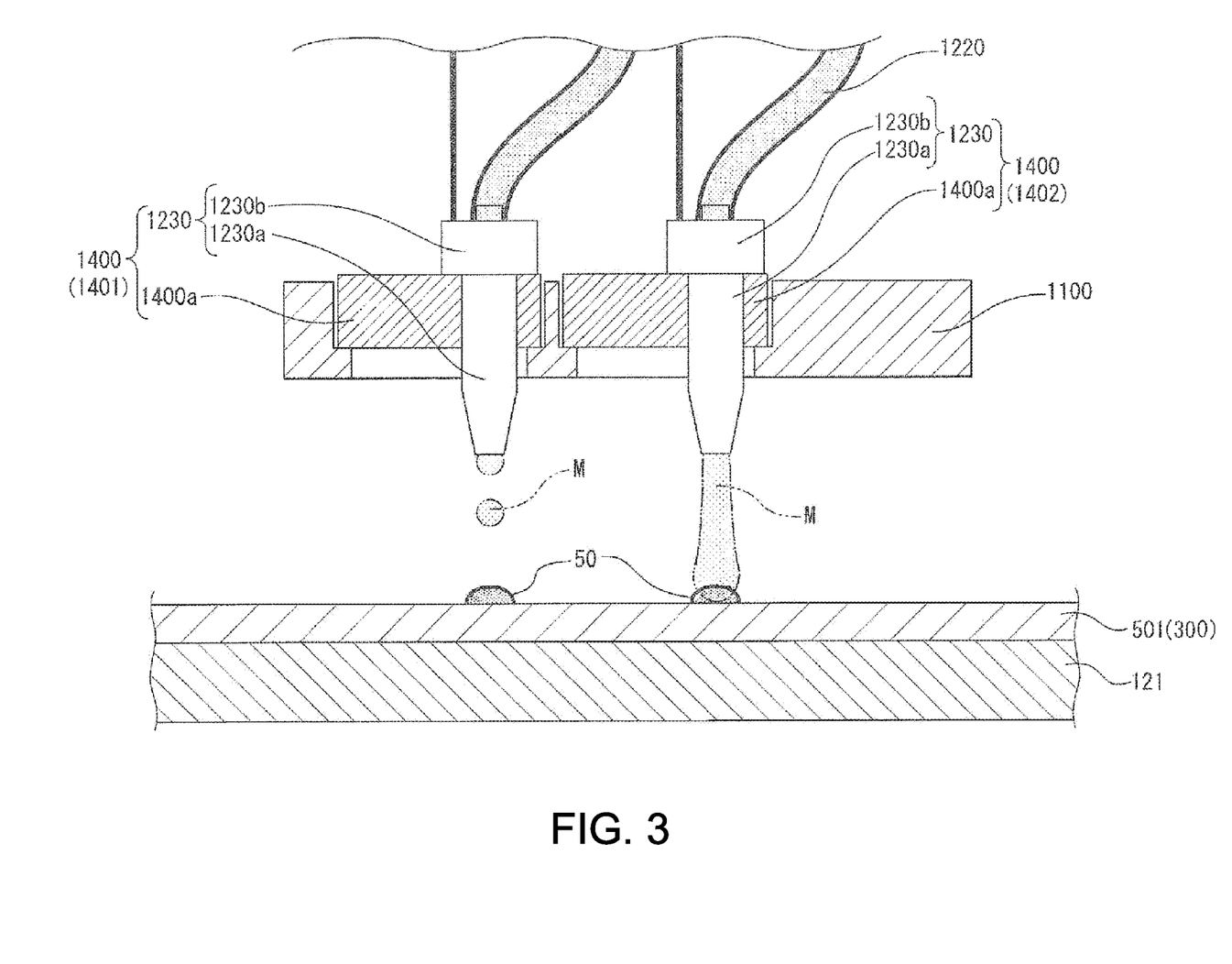
FIG. 3 is a schematic perspective view of a head base according to an embodiment of the invention.
Figure 4A:
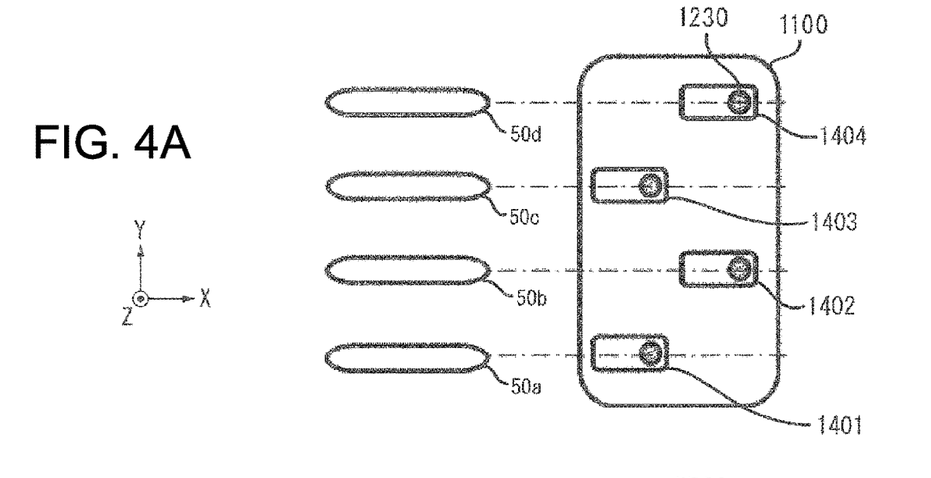
FIGS. 4A to 4C are plan views conceptually illustrating the relationship between the arrangement of head units and the form of formation of a three-dimensional shaped article according to an embodiment of the invention.
Figure 4B:
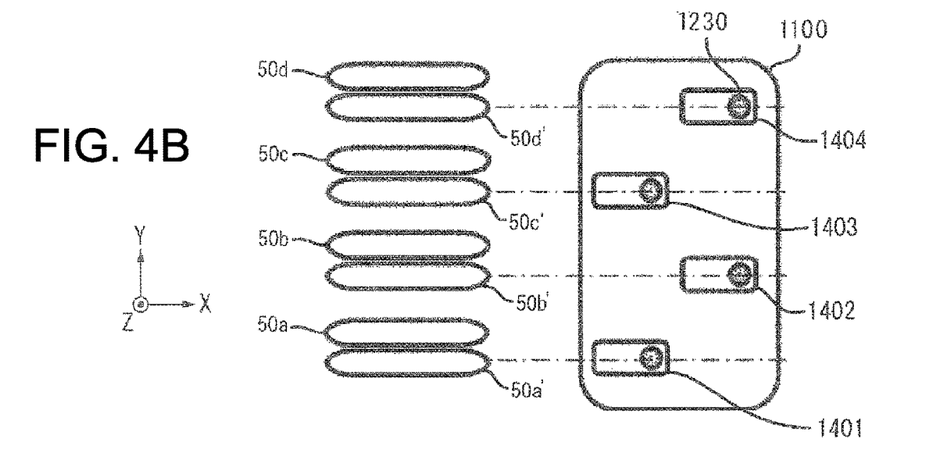
Figure 4C:
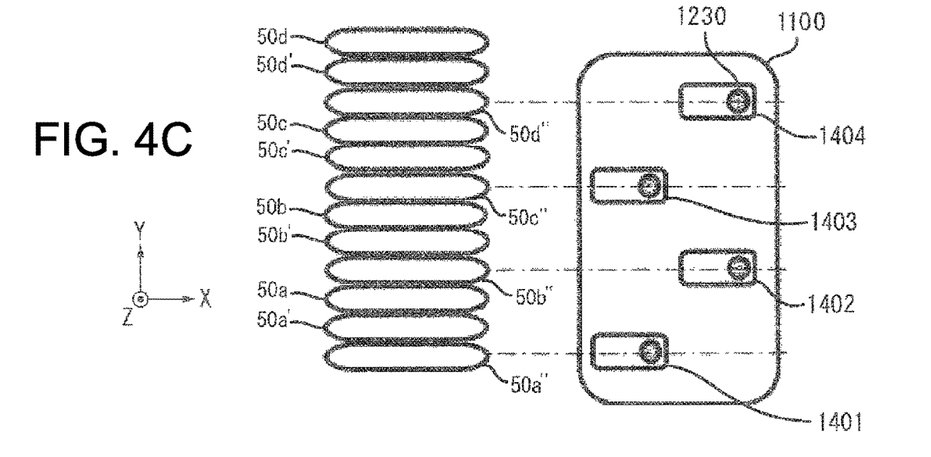

FIGS. 3 to 4C show one example of the holding form of a plurality of head units 1400 and the constituent material ejection sections 1230 held by the head base 1100, and among these, FIGS. 4A to 4C are external views of the head base 1100 viewed from the direction of the arrow D shown in FIG. 1B.

As shown in FIG. 3, a plurality of head units 1400 are held by the head base 1100 through a fixing unit (not shown). Further, as shown in FIGS. 4A to 4C, in the head base 1100 of the forming apparatus 2000 according to this embodiment, the head units 1400 are included such that the following 4 units: a head unit 1401 in the first row from the lower side in the drawing, a head unit 1402 in the second row, a head unit 1403 in the third row, and a head unit 1404 in the fourth row are arranged in a staggered manner (alternately). Then, as shown in FIG. 4A, while moving the stage 120 in the X direction with respect to the head base 1100, the constituent material is ejected from each head unit 1400, whereby constituent layer constituting parts 50 (constituent layer constituting parts 50*a*, 50*b*, 50*c*, and 50*d*) are formed. The procedure for forming the constituent layer constituting parts 50 will be described later.

Incidentally, although not shown in the drawing, the constituent material ejection sections 1230 included in the respective head units 1401 to 1404 are configured to be connected to the constituent material supply unit 1210 through the ejection drive section 1230*b* with the supply tube 1220.

As shown in FIG. 3, the constituent material ejection section 1230 ejects a material M which is the constituent material of the three-dimensional shaped article from the ejection nozzle 1230*a* to the layer 501 (the support layer 300 as the release layer) as the first layer S1 formed on the sample plate 121 placed on the stage 120. In the head unit 1401, an ejection form in which the material M is ejected in the form of a liquid droplet is illustrated, and in the head unit 1402, an ejection form in which the material M is ejected in the form of a continuous body is illustrated. The ejection form of the material M may be in the form of either a liquid droplet or a continuous body, however, in this embodiment, a case where a form in which the material M is ejected in the form of a liquid droplet is adopted will be described. Incidentally, a supply form of the material M is not limited to such a configuration, and for example, a configuration in which a material in the form of a solid at normal temperature is converted into a liquid by heating and ejected, or the like may be adopted.

The material M ejected in the form of a liquid droplet from the ejection nozzle 1230*a* flies substantially in the direction of gravity and lands on the sample plate 121. The stage 120 moves, and by the material M landing on the sample plate 121, the constituent layer constituting parts 50 are formed. An assembly of the constituent layer constituting parts 50 is formed as the layer 502 constituting the second layer S2 or the constituent layer 310 of the three-dimensional shaped article 500.

Next, the procedure for forming the constituent layer constituting parts 50 will be described with reference to FIGS. 4A to 5B.

Figure 5A:
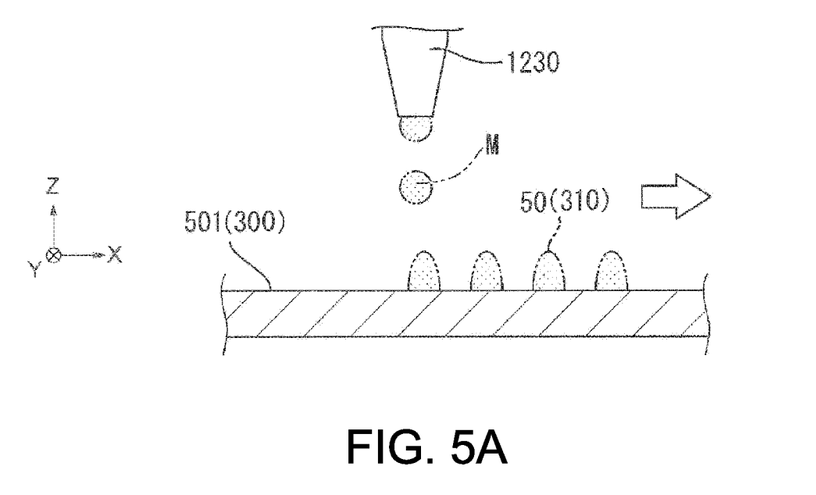
FIGS. 5A and 5B are schematic views conceptually illustrating the form of formation of a three-dimensional shaped article.
Figure 5B:
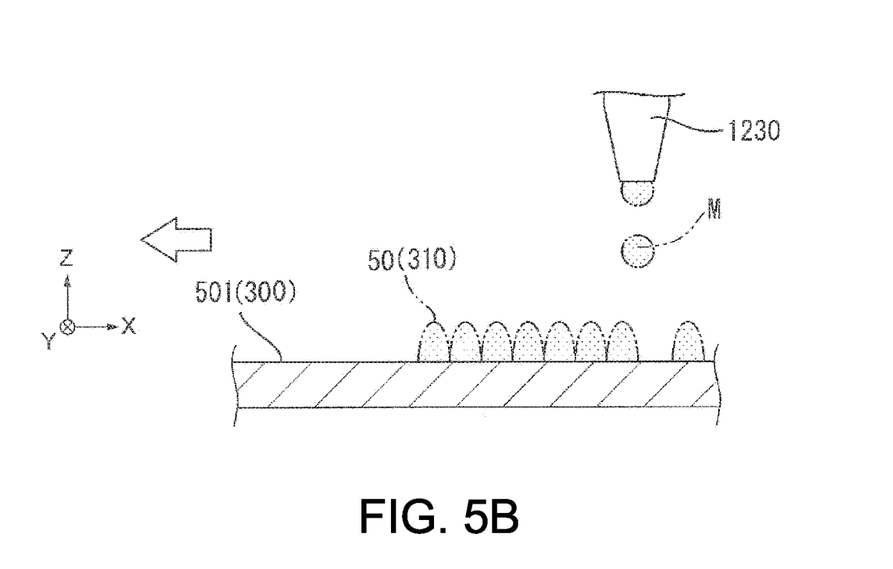

FIGS. 4A to 4C are plan views conceptually illustrating the relationship between the arrangement of head units 1400 of this embodiment and the form of formation of the constituent layer constituting parts 50. FIGS. 5A and 5B are side views conceptually illustrating the form of formation of the constituent layer constituting parts 50.

First, when the stage 120 moves in the +X direction, the material M is ejected in the form of a liquid droplet from the plurality of ejection nozzles 1230a, and the material M is placed at a predetermined position on the sample plate 121, and therefore, the constituent layer constituting parts 50 are formed.

More specifically, first, as shown in FIG. 5A, while moving the stage 120 in the +X direction, the material M is placed at predetermined positions at regular intervals on the sample plate 121 from the plurality of ejection nozzles 1230a.

Subsequently, as shown in FIG. 5B, while moving the stage 120 in the −X direction shown in FIG. 1A, the material M is newly placed so as to fill the gap between the materials M placed at regular intervals.

However, a configuration in which while moving the stage 120 in the +X direction, the materials Mare ejected from the plurality of ejection nozzles 1230a so that the materials M overlap with each other (so as not to form a gap) at predetermined positions on the sample plate 121 (not a configuration in which the constituent layer constituting parts 50 are formed by the reciprocation of the stage 120 in the X direction, but a configuration in which the constituent layer constituting parts 50 are formed by only one way movement of the stage 120 in the X direction) may be adopted.

By forming the constituent layer constituting parts 50 as described above, the constituent layer constituting parts 50 (the constituent layer constituting parts 50a, 50b, 50c, and 50d) for one line (of the first line in the Y direction) in the X direction of the respective head units 1401, 1402, 1403, and 1404 as shown in FIG. 4A are formed.

Subsequently, in order to form constituent layer constituting parts 50' (constituent layer constituting parts 50a', 50b', 50c', and 50d') of the second line in the Y direction of the respective head units 1401, 1402, 1403, and 1404, the head base 1100 is moved in the −Y direction. As for the amount of movement, when the pitch between the nozzles is represented by P, the head base 1100 is moved in the −Y direction by a distance of P/n (n represents a natural number). In this embodiment, a description will be given by assuming that n is 3.

By performing the same operation as described above as shown in FIGS. 5A and 5B, the constituent layer constituting parts 50' (constituent layer constituting parts 50a', 50b', 50c', and 50d') of the second line in the Y direction as shown in FIG. 4B are formed.

Subsequently, in order to form constituent layer constituting parts 50" (constituent layer constituting parts 50a", 50b", 50c", and 50d") of the third line in the Y direction of the respective head units 1401, 1402, 1403, and 1404, the head base 1100 is moved in the −Y direction. As for the amount of movement, the head base 1100 is moved in the −Y direction by a distance of P/3.

Then, by performing the same operation as described above as shown in FIGS. 5A and 5B, the constituent layer constituting parts 50" (constituent layer constituting parts 50a", 50b", 50c", and 50d") of the third line in the Y direction as shown in FIG. 4C are formed, and thus, the constituent layer 310 can be obtained.

Further, as for the material M ejected from the constituent material ejection section 1230, from any one unit or two or more units of the head units 1401, 1402, 1403, and 1404, a constituent material different from the other head units can also be ejected and supplied. Therefore, by using the forming apparatus 2000 according to this embodiment, a three-dimensional shaped article formed from different materials can also be obtained.

Further, by ejecting the support layer forming material from the support layer forming material ejection section 1730, the support layer 300 can be formed as the layer 501 which is the first layer S1 in the same manner as described above. Then, on the layer 501 which is the first layer S1, the constituent layer 310 and the support layer 300 can be formed in the same manner as described above when the layers 502, 503, ..., and 50n which are the second layer S2 are formed. The support layer 300 can be sintered or the like using the laser irradiation section 3100 and the galvanometer mirror 3000 according to the type of the support layer forming material.

Figure 6A:
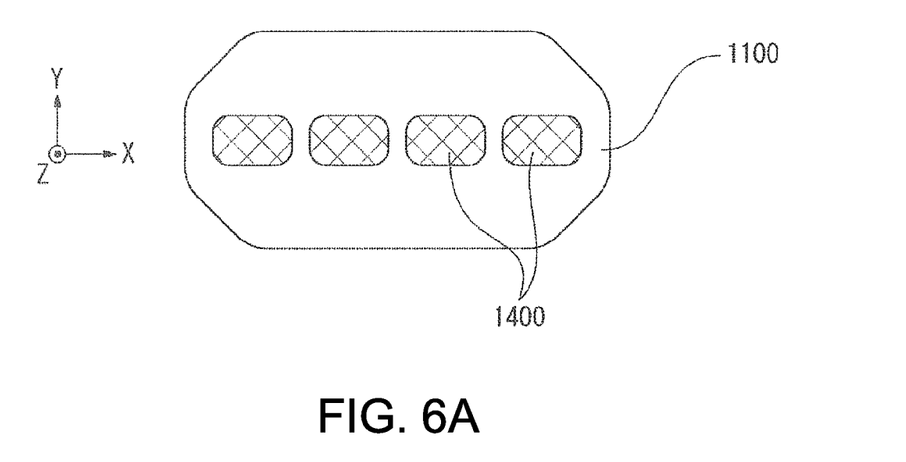
FIGS. 6A and 6B are schematic views showing examples of other arrangements of head units arranged in a head base.
Figure 6B:
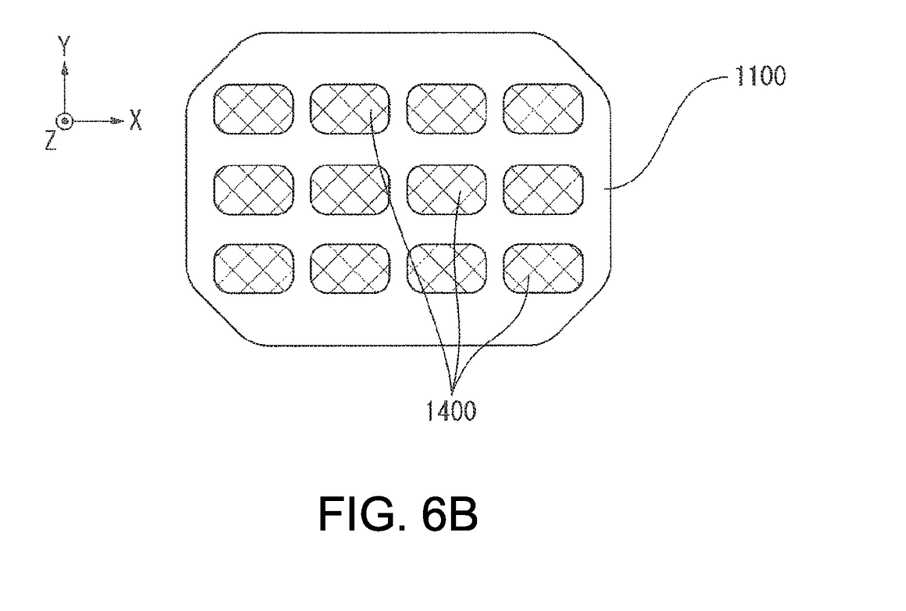

The number and arrangement of the head units 1400 and 1900 included in the forming apparatus 2000 according to this embodiment described above are not limited to the above-mentioned number and arrangement. FIGS. 6A and 6B schematically show examples of other arrangement of the head units 1400 placed in the head base 1100.

FIG. 6A shows a form in which a plurality of head units 1400 are arranged in parallel in the X-axis direction in the head base 1100. FIG. 6B shows a form in which the head units 1400 are arranged in a lattice in the head base 1100. The number of the head units to be arranged is not limited to the examples shown in FIGS. 6A and 6B.

Next, one embodiment of a three-dimensional shaped article production method to be performed using the above-mentioned forming apparatus 2000 according to this embodiment will be described.

FIGS. 7A to 7F are schematic views showing one example of a three-dimensional shaped article production process to be performed using the above-mentioned forming apparatus 2000. FIGS. 7A to 7F show the three-dimensional shaped article production process viewed from the side.

Figure 7A:
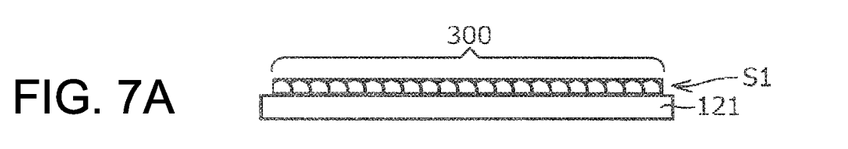
FIGS. 7A to 7F are schematic views showing a three-dimensional shaped article production process according to an embodiment of the invention.

First, FIG. 7A shows a state where the support layer 300 as a release layer is formed as the first layer S1 on the sample plate 121 using the support layer forming material ejection section 1730. In this embodiment, as the support layer forming material, a material containing ceramic particles as the first particles and a resin as the binder is used. In this embodiment, as the ceramic particles, particles in a spherical shape are used, however, the shape thereof may be a needle shape, a fibrous shape, a leaf shape, or the like.

Here, FIG. 7A shows a state where the support layer forming material is ejected from the support layer forming material ejection section 1730 and also a laser from the laser irradiation section 3100 is irradiated onto the support layer forming material. The ceramic particles as the first particles are not sintered by the irradiation with the laser, and are in a state where since the binder is left in the support layer 300, the particles on the sample plate 121 are bound to one another. Incidentally, the laser irradiation conditions may be appropriately changed according to the type or amount of the resin as the binder, or in the case where a solvent is contained in the support layer forming material, the solvent may be evaporated by irradiation with a laser.

Figure 7B:
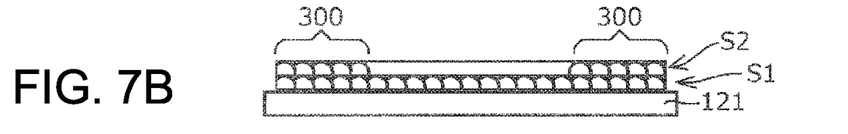

Subsequently, FIG. 7B shows a state where the support layer 300 is formed in a region (three-dimensional shaped article non-formation region) other than the three-dimensional shaped article formation region on the support layer 300 as the first layer S1 using the support layer forming material ejection section 1730.

Figure 7C:
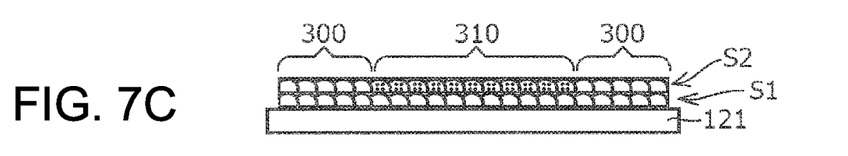

Subsequently, FIG. 7C shows a state where the constituent layer 310 is formed as the second layer S2 in the three-dimensional shaped article formation region on the support layer 300 as the first layer S1 using the constituent material ejection section 1230. In this embodiment, as the constituent material, a material containing metal particles as the second particles and a resin as the binder is used. Here, the type and amount of the respective resins is adjusted so that the binding force between the metal particles by the resin contained in the constituent material is larger than the binding force between the ceramic particles by the resin contained in the support layer forming material. In the case where a solvent is contained in the constituent material, the solvent may be evaporated by irradiation with a laser under the conditions that the metal particles are not sintered.

Figure 7D:
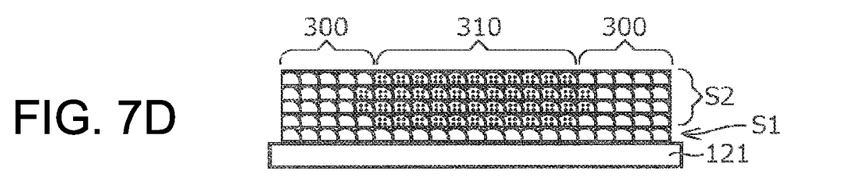

Then, by repeating the formation of the support layer 300 shown in FIG. 7B and the formation of the constituent layer 310 shown in FIG. 7C, a stacked body of the three-dimensional shaped article is formed as shown in FIG. 7D.

Figure 7E:
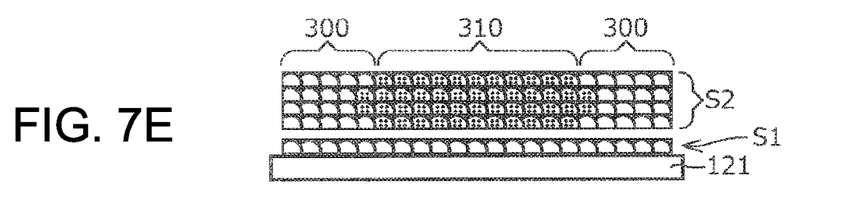

Here, FIG. 7E shows a state where the stacked body of the three-dimensional shaped article (the second layer S2) formed as shown in FIG. 7D is released from the sample plate 121. In FIG. 7E, a state where the support layer 300 as the first layer S1 and the stacked body of the three-dimensional shaped article (the second layer S2) are released from each other is shown, however, the sample plate 121 and the support layer 300 as the first layer S1 may be released from each other. Further, in a part, the support layer 300 as the first layer S1 and the stacked body of the three-dimensional shaped article (the second layer S2) may be released from each other, and in another part, the sample plate 121 and the support layer 300 as the first layer S1 may be released from each other.

Figure 7F:
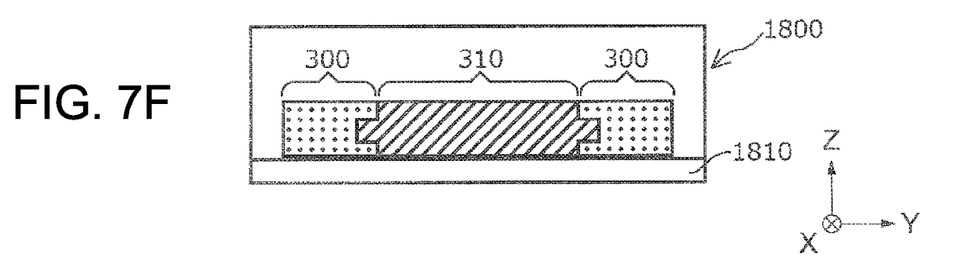

FIG. 7F shows a state where the constituent layers 310 in the stacked body of the three-dimensional shaped article released from the sample plate 121 as shown in FIG. 7E are sintered in a thermostatic chamber (heating chamber) 1800 provided separately from the forming apparatus 2000 according to this embodiment. As the metal particles, particles having a lower melting point lower than that of the ceramic particles are selected. Further, the sintering step is performed at a temperature, which is lower than the melting points of the metal particles and the ceramic particles, and at which the metal particles are sintered, but the ceramic particles are not sintered.

Incidentally, in FIG. 7F, as the sintering of the constituent layers 310 in the stacked body of the three-dimensional shaped article proceeds, the binder component contained in the support layers 300 is decomposed (thermally decomposed), and by applying a small external force thereto, the ceramic particles are separated from each other and fall apart. In this embodiment, a state where the sintering is performed on a ceramic plate 1810 which has high heat resistance is shown.

Next, one example of the three-dimensional shaped article production method to be performed using the above-mentioned forming apparatus 2000 (an example corresponding to FIGS. 7A to 7F) will be described with reference to a flowchart.

Figure 8:
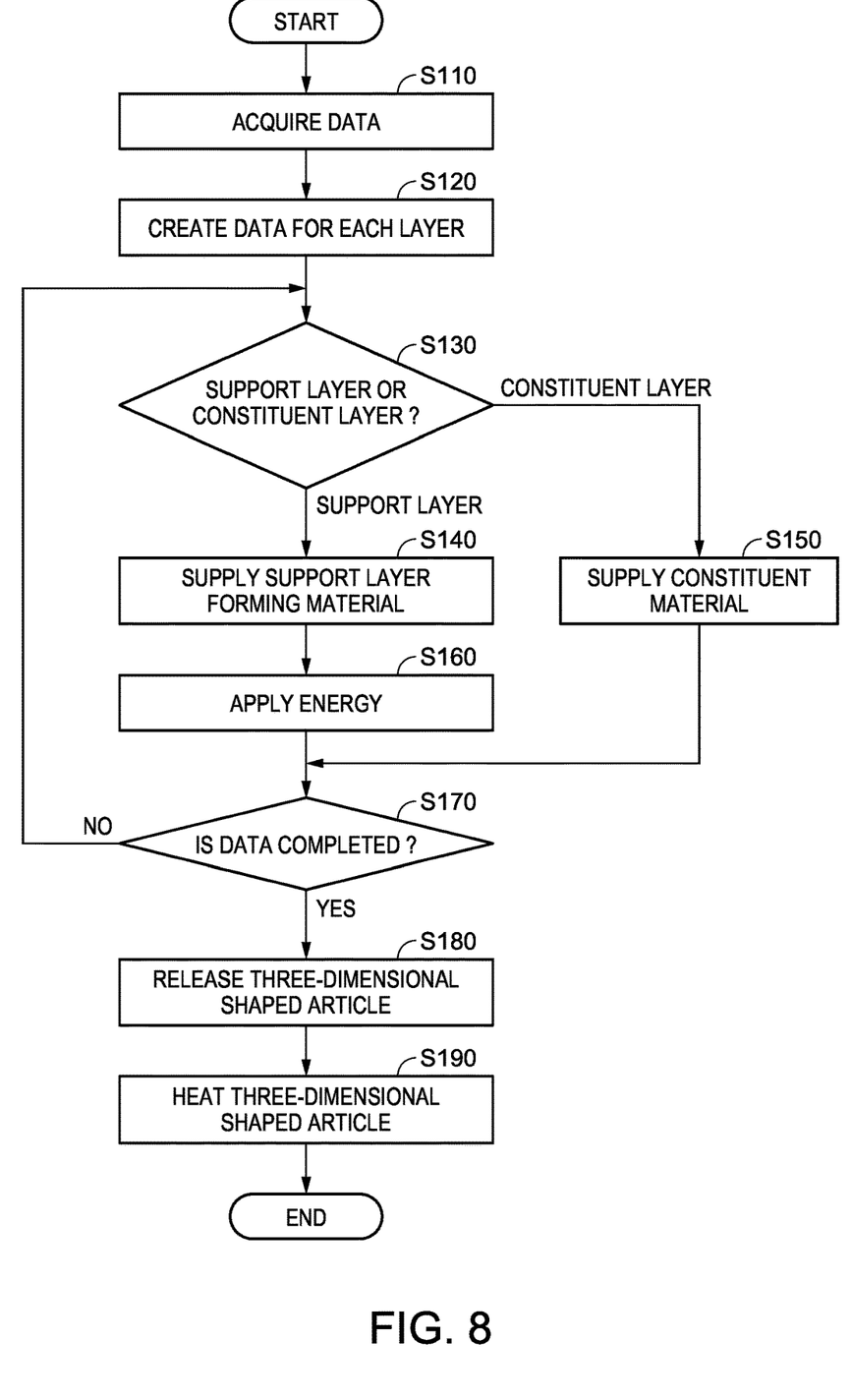
FIG. 8 is a flowchart showing a three-dimensional shaped article production method according to an embodiment of the invention.

Here, FIG. 8 is a flowchart of the three-dimensional shaped article production method according to this embodiment.

As shown in FIG. 8, in the three-dimensional shaped article production method according to this embodiment, first, in Step S110, the data of the three-dimensional shaped article is acquired. More specifically, the data representing the shape of the three-dimensional shaped article is acquired from, for example, an application program or the like executed by a personal computer.

Subsequently, in Step S120, data for each layer are created. More specifically, in the data representing the shape of the three-dimensional shaped article, the three-dimensional shaped article is sliced according to the shaping resolution in the Z direction, and bitmap data (cross-sectional data) are created for each cross section.

At this time, the bitmap data to be created are data discriminated between the three-dimensional shaped article formation region (constituent layer 310) and the three-dimensional shaped article non-formation region (support layer 300).

Subsequently, in Step S130, it is determined whether the data of the layer to be formed is the data for forming the three-dimensional shaped article non-formation region (support layer 300) or the data for forming the three-dimensional shaped article formation region (constituent layer 310). This determination is performed by the control section included in the control unit 400.

In this step, in the case where the data is determined to be the data for forming the support layer 300, the process proceeds to Step S140, and in the case where the data is determined to be the data for forming the constituent layer 310, the process proceeds to Step S150.

In Step S140, by ejecting the support layer forming material from the support layer forming material ejection section 1730 based on the data for forming the support layer 300, the support layer forming material is supplied.

Here, the step of forming the layer 501 which is the first layer S1 (a first layer formation step) corresponds to this step. However, also the step of forming the support layer 300 in the second layer S2 (a second layer formation step) corresponds to this step.

Then, when the support layer forming material is ejected in Step S140, a laser is irradiated (energy is applied) from the laser irradiation section 3100 through the galvanometer mirror 3000 in Step S160, whereby the ejected liquid droplet (the support layer 300) is solidified.

On the other hand, in Step S150, by ejecting the constituent material from the constituent material ejection section 1230, the constituent material is supplied. The step of forming the layers 502, 503, . . . , and 50n which are the second layer S2 (a second layer formation step) corresponds to this step.

Then, the process is repeated from Step S130 to Step S170 until it is determined in Step S170 that the formation of the stacked body of the three-dimensional shaped article based on the bitmap data corresponding to the respective layers formed in Step S120 is completed.

Then, the stacked body of the three-dimensional shaped article is released from the sample plate 121 in Step S180, and the stacked body of the three-dimensional shaped article formed in the above steps is heated in the thermostatic chamber 1800 in Step S190. More specifically, the three-dimensional shaped article formation region (constituent layer 310) is sintered.

Then, accompanying the completion of Step S190, the three-dimensional shaped article production method of this embodiment is completed.

As described above, the three-dimensional shaped article production method of this embodiment is a three-dimensional shaped article production method for producing a three-dimensional shaped article by stacking layers to form a stacked body.

Then, the method includes the first layer formation step (corresponding to Step S140) of forming the first layer S1 on the sample plate 121 by supplying the support layer forming material which is the first composition containing the ceramic particles and the resin, the second layer formation step (corresponding to Step S150 and also Step S140 in the case where the support layer 300 is formed in the second layer S2) of forming the second layer S2 composed of one layer or a plurality of layers (the stacked body of the three-dimensional shaped article) on the first layer S1 by supplying the constituent material which is the second composition containing the metal particles and the resin, and the separation step (corresponding to Step S180) of separating the second layer S2 from the sample plate 121 through the first layer S1.

Then, after the separation step, the sintering step (corresponding to Step S190) of sintering the second layer S2 is performed.

In this manner, by performing the sintering step of sintering the second layer S2 after the separation step of separating the second layer S2 from the sample plate 121, the integration or the like of the sintered body of the three-dimensional shaped article with the sample plate 121 can be suppressed, and the load when the three-dimensional shaped article is separated from the sample plate 121 can be reduced.

It goes without saying that when the second layer S2 is formed, not only the layer is formed using the support layer forming material for forming the support layer 300 in addition to the constituent material as described above, but also the layer may be formed only from the constituent material.

Further, in the three-dimensional shaped article production method of this embodiment, as described above, the binding force between the ceramic particles by the resin contained in the support layer forming material is adjusted to be smaller than the binding force between the metal particles by the resin contained in the constituent material. Therefore, when the second layer S2 is separated from the sample plate 121 in the separation step, the second layer S2 is easily separated from the sample plate 121 without damaging the three-dimensional shaped article.

Here, as a method for adjusting the binding force between the ceramic particles by the resin contained in the support layer forming material to be smaller than the binding force between the metal particles by the resin contained in the constituent material, for example, a method in which as the binder contained in the support layer forming material and the binder contained in the constituent material, the same binder is used, and the amount of the binder contained in the support layer forming material is made smaller than the amount of the binder contained in the constituent material can be used. By using such a method, the binding force between the ceramic particles by the resin contained in the support layer forming material can be made smaller than the binding force between the metal particles by the resin contained in the constituent material. As a result, when the second layer S2 is separated from the support in the separation step, the second layer S2 is easily separated from the plate 121 without damaging the three-dimensional shaped article.

Specifically, for example, the amount of the binder contained in the support layer forming material is set to 5% or more and 60% or less, and the amount of the binder contained in the constituent material can be set larger than this.

Here, it is preferred that the surface of the plate 121 is made smooth by setting the arithmetic average surface roughness Ra of the plate 121 to 5 µm or less. It is because by making the surface of the plate 121 smooth, the occurrence of an anchor effect or the like on the plate 121 can be suppressed, and in the separation step, the separation of the second layer S2 from the plate 121 can be particularly easily performed.

Further, although not performed in the three-dimensional shaped article production method of this embodiment, a separation promotion step of promoting the separation of the second layer S2 from the plate 121 may be performed before the separation step. This is because the separation step can be facilitated.

For example, as the binders contained in the support layer forming material and in the constituent material, a binder whose decomposition temperature is lower than the decomposition temperature of a binder contained in the constituent material is used, and in the separation promotion step, the heating step of performing heating at a temperature higher than the decomposition temperature of the binder contained in the support layer forming material and lower than the decomposition temperature of the binder contained in the constituent material can be performed. Such a separation promotion step can be easily performed, and by performing the separation promotion step, the binding force between the ceramic particles by the resin contained in the support layer forming material can be easily made smaller than the binding force between the metal particles by the resin contained in the constituent material.

Further, for example, as the stage 120 and the plate 121, a material which can transmit an electromagnetic wave is used, and as the separation promotion step, an electromagnetic wave irradiation step of irradiating the support layer forming material with an electromagnetic wave through the stage 120 and the plate 121 (for example, from the lower side) can be performed. Such a separation promotion step can be easily performed, and by performing the separation promotion step, the binding force between the ceramic particles by the resin contained in the support layer forming material can be easily made smaller than the binding force between the metal particles by the resin contained in the constituent material.

Incidentally, the separation step may be performed either during the irradiation with an electromagnetic wave or after completion of the irradiation with an electromagnetic wave as long as it is after the irradiation with an electromagnetic wave as the separation promotion step is started. Examples of the constituent material capable of transmitting an electromagnetic wave include zirconia and silicon dioxide.

According to this embodiment, a titania layer is formed on the plate 121 as the support. The binder which is in contact with the titania layer is easily decomposed by irradiation with an electromagnetic wave, and therefore, in the separation step, the separation of the second layer S2 from the support (plate 121) can be particularly easily performed through the titania layer.

The invention is not limited to the above-mentioned embodiments, but can be realized in various configurations without departing from the gist of the invention. For example, the technical features in the embodiments corresponding to the technical features in the respective forms described in "SUMMARY" may be appropriately replaced or combined in order to solve part or all of the problems described above or achieve part or all of the advantageous effects described above. Further, the technical features may be appropriately deleted unless they are described as essential features in the specification.

What is claimed is:

1. A three-dimensional shaped article production method for producing a three-dimensional shaped article by stacking layers, comprising:
a first layer formation step of forming a first layer above a stage by supplying a first composition being a first paste-formed mixture comprising ceramic particles and a binder;
a second layer formation step of forming a second layer composed of one or more layers on the first layer by supplying a second composition being a second paste-formed mixture comprising metal particles and a binder, the metal particles have a sintering temperature lower than the sintering temperature of the ceramic particles;
a heating step of heating the first layer and the second layer at a temperature above a sintering temperature of the metal particles to sinter the metal particles, the temperature being below a sintering temperature of the ceramic particles.

2. The three-dimensional shaped article production method according to claim 1, wherein the first layer is formed above a ceramic plate arranged above the stage.

3. The three-dimensional shaped article production method according to claim 1, wherein the first paste-formed mixture and the second paste-formed mixture are supplied in form of a continuous body.

4. The three-dimensional shaped article production method according to claim 1, wherein the heating step is carried out using a heating chamber.

5. The three-dimensional shaped article production method according to claim 1, wherein the heating step is performed at a temperature, which is lower than the melting points of the metal particles and the ceramic particles.

6. The three-dimensional shaped article production method according to claim 1, wherein a binding force between the ceramic particles by the binder contained in the first composition is smaller than a binding force between the metal particles by the binder contained in the second composition.

7. The three-dimensional shaped article production method according to claim 6, wherein the amount of the binder contained in the first composition is smaller than the amount of the binder contained in the second composition.

8. The three-dimensional shaped article production method according to claim 1, wherein the first layer is a layer separated from the second layer after the heating step.

9. The three-dimensional shaped article production method according to claim 8, wherein before the first layer is separated from the second layer, a separation promotion step of promoting a separation of the first and second layer from the stage is performed.

10. The three-dimensional shaped article production method according to claim 9, wherein the decomposition temperature of the binder contained in the first composition is lower than the decomposition temperature of the binder contained in the second composition, and the separation promotion step is a heating step of performing heating at a temperature higher than the decomposition temperature of the binder contained in the first composition and lower than the decomposition temperature of the binder contained in the second composition.

11. The three-dimensional shaped article production method according to claim 9, wherein the stage is configured to be capable of transmitting an electromagnetic wave, and the separation promotion step is an electromagnetic wave irradiation step of irradiating the first composition with an electromagnetic wave through the stage.

12. The three-dimensional shaped article production method according to claim 11, wherein a titania layer is formed on the stage.

13. The three-dimensional shaped article production method according to claim 1, wherein the arithmetic average surface roughness Ra of the stage is 5 μm or less.

* * * * *